Patented June 27, 1939

2,163,607

UNITED STATES PATENT OFFICE 2,163,607

MANUFACTURE OF ARTIFICIAL THREADS OR OTHER PRODUCTS FROM CELLULOSE COMPOUNDS

Leon Lilienfeld, Vienna, Austria

No Drawing. Application August 12, 1931, Serial No. 556,719. In Great Britain August 25, 1930

17 Claims. (Cl. 18—54)

This invention relates to the manufacture of new derivatives of cellulose and of artificial threads and other products therefrom.

In my U. S. application Ser. No. 435,647 (now Patent 1,858,097) I have shown that technically valuable compounds are obtainable by xanthating hydroxyalkyl derivatives of cellulose, and in U. S. application Ser. No. 521,023 I have further shown that technically valuable compounds are obtainable by xanthating certain alkali-soluble alkyl or aralkyl derivatives of cellulose or cellulose ethers of hydroxy-alkyl-carboxylic acids.

In continuing my researches in this subject I have discovered that a large number of cellulose compounds or cellulose derivatives can be xanthated to produce useful products. Of course, it could not be expected that all of the new products will behave equally well. As a matter of fact, there must obviously be some where no special advantages can be demonstrated.

In the subjoined list I name a number of reagents which I have used for treating cellulose for the purpose of making cellulose compounds or cellulose derivatives capable of being usefully xanthated in accordance with my invention:

(1) Di-halogen paraffins, for example compounds of the type of ethylene chloride or trimethylene chloride (which may be regarded as halogen hydracid esters of di-hydric paraffin alcohols (glycols)), or of the type of methylene chloride (which may be regarded as neutral halogen hydracid esters of glycols with two hydroxyl groups attached to one and the same carbon atom).

(2) Poly halogen paraffins (for example acetylene tetrachloride $C_2H_2Cl_4$, pentachloroethane $C_2HCl_5$, 1:2:3-trichloropropane, etc.) the prefix "poly" here being used to mean more than two.

(3) Halogen olefins (halogen hydracid esters of unsaturated alcohols).

(4) Halogen derivatives of ethers of monohydric alcohols.

(5) Halogen derivatives of aldehydes or ketones.

(6) Sulphochlorides of tertiary amines, such as, for example the sulphochloride of dimethylaniline.

(7) Halogen derivatives of higher fatty acids having at least 6 carbon atoms.

(8) Halogen derivatives of olefine mono-carboxylic acids.

(9) Sulphochlorides of heterocyclic compounds which contain one nitrogen atom in the ring, for example quinoline or pyridine.

(10) Halogen derivatives of oxy-acids, for example β-di-chloro-lactic acid or β-trichloro-lactic acid.

(11) Halogen derivatives of keto-carboxylic acids.

(12) Halogen derivatives of nitro-methane, such as chloro-picrin.

(13) Urea halides, alkyl-urea halides, aralkyl-urea halides and aryl-urea halides.

(14) Halogen derivatives of heterocyclic compounds having one nitrogen atom in the ring, for example halogen derivatives of pyridine or of its homologues, or of halogen derivatives of quinoline or of its homologues, or halogen derivatives of iso-quinoline or of its homologues.

(15) Halogen derivatives of cyanogen, such as cyanogen halides or cyanuric halides (tri-cyanogen halides).

(16) Halogen derivatives of di-carboxylic acids, such as halogen succinic acid.

(17) Halogen derivatives of hydro-naphthalene compounds, for example di-hydro-naphthalene-di-bromide or tetra-hydro-naphthalene-glycol-chlorhydrin.

(18) Sulphochlorides of hydrocarbons, such as ortho- or para-toluene sulphochloride, naphthalene sulpho-chloride.

(19) Halogen derivatives of halogenated alkyl phenyl ethers, such as benzoylated chloro-anisol.

(20) Halogen derivatives of condensed nuclei for example α-naphthalene-mono-halides or halogenated naphthalenes.

(21) Acid halides, for example benzoyl halides, malonyl halides, di-ethyl malonyl halides.

(22) Halogen derivatives of aromatic mono-carboxylic acids.

(23) Halogen hydracid esters of phenyl glycols or phenyl glycerines or of their derivatives, for example ethers.

(24) Sulphochlorides of phenyl-mono-hydroxy-carboxylic acids, such as salicylic acid or cresotinic acid and chloro- or nitro-substitution products thereof.

(25) Phenyl-halogen-fatty acids, for example phenyl-chloro-acetic acid or phenyl-chloro-propionic acid.

(26) Halogen derivatives of phenyl-paraffin-alcohol acids, for example phenyl-halogen-lactic acid or phenyl-halogen-hydroxy-propionic acid.

(27) Halogen derivatives of olefine-benzols.

(28) Halogen derivatives of phenyl-olefine alcohols or hydroxy-phenyl-olefine alcohols.

(29) Halogen derivatives of pseudophenols, methylene quinones and quinols, for example ortho-hydroxy-mesityl chloride or piperonyl chloride.

In view of the large number of xanthated cellulose compounds or cellulose derivatives that I have made, it appears that it is possible to xanthate many products made by treating cellulose in the presence of a basic substance, particularly alkali, with a reagent which is capable of reacting upon alkali cellulose with the formation of a cellulose compound or derivative in which one or more (but not all) of the hydroxyl groups of the original cellulose molecule are exchanged for groups or radicals.

The present invention therefore, so far as it is concerned with the manufacture of new cellulose derivatives, may be expressed in the following terms:

A manufacture of new derivatives of cellulose by xanthating products made by the action on cellulose in the presence of a basic substance, particularly alkali, of a reagent (other than an hydroxy-alkylating agent, or an alkylating agent, or an aralkylating agent or an agent which introduces a hydroxy-carboxylic acid group or a reagent as covered in my copending case, now Patent 1,910,440, namely a cyclic ether of a polyhydric alcohol, examples being ethylene oxide, glycide and butadiene dioxide) which is able to react with an alkali cellulose, so as to cause introduction of an organic group or radical in place of alkali metal therein, whereby at least one of the hydroxyl groups of the original cellulose is occupied or blocked, as the result of the reaction, by an organic group, while at least one hydroxyl group remains free. This cellulose derivative is xanthated by acting thereupon with carbon bisulphide in the presence of a basic substance (preferably caustic alkali).

The invention also has for an object the manufacture of artificial structures, particularly threads:

(1) From certain cellulose compounds or cellulose derivatives, which, owing to their insolubility in any solvent or insolubility in technically feasible solvents, have hitherto been incapable of being converted into useful artificial structures, for instance artificial threads, or (2) From solutions in certain aqueous liquids, particularly aqueous alkali solutions, of certain cellulose compounds or cellulose derivatives, which, although soluble in some other solvents, are insoluble in aqueous liquids in general and in aqueous alkali solutions in particular, but are brought into solution in the form of xanthates, by this invention, or (3) From certain cellulose compounds or cellulose derivatives which are soluble in certain aqueous liquids, especially alkali solutions, the solutions of which, however, when converted into artificial structures, for example artificial threads, by means of any precipitating bath, yield products that are useless or imperfect in one or more respects, or (4) From certain cellulose compounds or cellulose derivatives which, either by themselves or in the form of their xanthates, yield useful artificial structures, particularly artificial threads, but, when converted into their xanthates, if necessary, and worked up into artificial structures by means of a single bath that has both a coagulating effect on the shaped solution of the xanthate and a plasticising effect on the artificial material, particularly thread, during or immediately after its coagulation, or by means of two consecutive baths, the first of which has a coagulating effect on the shaped xanthate solution and the second a plasticizing effect on the freshly coagulated material, lead to artificial structures, which, in respect of their tenacity or their extensibility or elasticity or in some other property (fineness of threads or soft feel or affinity for dyestuffs or covering power or lustre or transparency or the like) are superior to the artificial structures, particularly threads, hitherto obtained from these cellulose compounds or derivatives, or (5) From certain cellulose compounds or cellulose derivatives which, although soluble in certain aqueous liquids, particularly aqueous alkalies, cannot successfully be directly converted into artificial structures, particularly threads, because their shaped solutions, when brought into contact with coagulating baths, do not form coherent artificial structures, for example film or threads, but in the form of their xanthates do yield useful artificial structures, particularly threads, when so treated by means of the aforesaid Lilienfeld bath.

In the foregoing statement I have indicated properties in which the artificial structures, particularly threads, produced may be said to excel; the particular properties in each case depend to a great extent on the chemical nature or physical nature or both of the xanthated cellulose compound or cellulose derivative used and it would be a hopeless task to enumerate the advantageous properties of each material which can be made in accordance with my invention.

The process of making the new cellulose derivatives comprises first treating cellulose in the presence of a basic substance, particularly alkali, with a reagent (except a halogen derivative of a di- or poly-hydroxylic alcohol, or an inorganic ester of a mono-valent alcohol, or an aralkyl halide, or a cyclic ether in presence of caustic alkali, or mono-halogen derivative of a lower fatty acid) which is capable of reacting with cellulose or alkali cellulose with the formation of a cellulose compound or derivative in which one or more but not all of the hydroxyl hydrogen atoms of the cellulose molecule are replaced by groups or radicals and then xanthating the product thus obtained (by itself or in presence of cellulose or another cellulosic body) or the reaction mass resulting from the preparation of said product.

The present process may also be carried out in such a manner that, in addition to one or more reagents characteristic of the invention, one or more halogen derivatives of di- or polyhydroxylic alcohols or one or more halogen fatty acids or one or more trithiocarbonic acid esters or one or more alkylating agents or one or more cyclic ethers, such as alkylene oxides, are employed in the preparation of the cellulose compound or derivative to be xanthated.

The process of making artificial structures from the new cellulose derivatives comprises bringing the xanthated product into the appropriate shape or form and acting upon it (a) with an agent that has merely a coagulating effect on the shaped material, or (b) first with an agent having the said coagulating effect and then with an agent that has a plasticising effect on the freshly coagulated structure, or (c) with an agent that has both a coagulating effect and a plasticising effect.

It is impossible to indicate every condition for success in every particular case, and it is to be understood that preliminary experiments cannot be avoided to find out what are the most advantageous conditions necessary for success when using a particular reagent or mixture of reagents belonging to the various groups set forth in the list as set forth above particular working conditions, such as temperature or the like for the reaction between the reagents in question and the cellulose, a particular cellulose, a particular process for xanthation and particular details and conditions of the operation connected with the manufacture of the artificial materials, for example spinning operation.

The following examples, to which, however, the invention is not limited, illustrate the manufacture of a few of the new cellulose derivatives obtainable by the invention, and their conversion into artificial materials; the parts are by weight:

*Example 1.*—1,000 parts of wood-pulp or cotton linters are steeped in 20,000 parts of caustic soda solution of 18 per cent. strength at 15° C., and the reaction mass is allowed to stand for 3 hours at room temperature. After this time, the excess of the caustic soda solution is removed by pressing the alkali cellulose, for example until it weighs 3,000 to 4,000 parts, and the pressed alkali cellulose is comminuted in a shredder for about 3 hours at 12 to 15° C. Thereafter 1,000 parts of ethylene chloride are gradually added and the reaction mass kneaded in the shredder for about 3 hours at 15 to 20° C.

The reaction mass is now, or after having stood for 24 to 48 hours at room temperature, placed in a filter press or on a straining cloth, and washed with water until free from alkali, whereupon the excess of water is pressed out and the water content of the pressed product determined by drying a sample at 100° C.

The pressed mass is now well mixed with such an amount of water and caustic soda as, together with the water present in the mass to contain 20,000 parts of caustic soda solution to 18 per cent. strength. The reaction mixture is now allowed to remain at room temperature for 3 hours, after which it is pressed down to 3,000 to 4,000 parts and comminuted in a shredder for 3 hours at 12 to 15° C. Immediately after shredding, the reaction mass is placed in a closed vessel, preferably capable of being agitated, whereupon 600 parts of carbon bisulphide are added and allowed to act for 6 to 10 hours at 18 to 20° C. The excess carbon bisulphide is now blown off during 15 minutes, and the xanthated mass dissolved in so much water and caustic soda, as to yield a solution which contains about 5 to 7 per cent. of the dry residue (determined before the xanthating step by drying a sample of the washed and pressed product) and 8 per cent. of caustic soda. Before being spun, the solution is allowed to ripen for 48 to 96 hours at 15° C. during which time it is filtered 3 to 4 times through cotton. The solution is then spun into a bath containing 40 to 75 per cent. of sulphuric acid monohydrate in the manner described in the examples of my U. S. Reissue Patent 18,170.

If desired, before entering the bath containing 40 to 75 per cent. of $H_2SO_4$, the thread-like viscose stream may be conducted through any setting bath that has only a coagulating, but no plasticising effect on the freshly coagulated thread, for example in the manner described in Example X of said reissue patent.

In the foregoing example, before being brought into contact with the ethylene chloride, the alkali cellulose may be matured, for instance for 24 to 72 hours at 15 to 20° C.

Also the alkali compound of the washed and pressed product, produced by bringing together the alkali cellulose with the ethylene chloride, may, before being treated with the carbon bisulphide, be allowed to mature for, say, 24 to 72 hours at 15 to 20° C.

In the foregoing example, the xanthated mass may alternatively be dissolved in such an amount of water and caustic soda, as to yield a solution which contains about 5 to 7 per cent. (and, if a cellulose having a high viscosity is employed as primary material, 3 to 5 per cent.) of the dry residue determined in the washed and pressed product before the xanthating step, and 5 per cent. of caustic soda.

*Example 2.*—The process is conducted as in Example 1, but with the difference that 30 parts of copper acetate, dissolved in a small amount of water, are added to the alkali cellulose before bringing the latter into contact with the ethylene chloride.

*Example 3.*—Mode of operation as in Example 1, but with the difference that 6000 parts of caustic soda solution of 18 per cent. strength are added to the cellulose in small portions whilst the mass is continually kneaded or shredded respectively. The addition of caustic soda solution occupies 20 to 30 minutes, whereupon without being pressed, the reaction mass is shredded or kneaded for another 1½ to 2 hours, the temperature of the reaction being controlled so as not to exceed 25° C. Thereafter 1000 parts of ethylene chloride are gradually added and the reaction mass kneaded in the shredder for about 3 hours at 15 to 20° C.

The reaction mass is now, or after having stood for 24 to 48 hours at room temperature, placed in a filter press or on a straining cloth, and washed with water until free from alkali, whereupon the excess of water is pressed out and the water content of the pressed product determined by drying a sample at 100° C.

The reaction mass is now worked up, that is washed, xanthated, dissolved and spun as in Example 1.

*Example 4.*—The process is conducted as in Example 1 or 2 or 3, but with the difference that the reaction mass produced by the treatment of the alkali cellulose with the ethylene chloride, after washing and pressing, is well mixed with such an amount of water and caustic soda, as, together with the water present in the mass, to contain 2000 to 4000 parts of caustic soda solution of 18 per cent. strength, the mixing being performed in a cooled shredder or kneading machine in such a manner that the temperature is not allowed to rise above 25° C. After shredding, the reaction mass is, without being pressed, xanthated, dissolved and spun as in Example 1.

*Example 5.*—Note of procedure as in Example 1 or 2 or 3, but with the exception that the reaction mass, produced by the treatment of the alkali cellulose with the ethylene chloride, is not washed and pressed, but after said treatment, or after having stood for 24 to 48 hours at room temperature, directly brought into contact with the carbon bisulphide.

In this modification of Example 1 or 2 or 3, it is recommended to determine the caustic soda- and water-content in the product obtained by the treatment of the alkali cellulose with ethylene chloride, and, in the event of the caustic soda solution present in the mass containing less than 15 to 18 per cent. of NaOH, to add, preferably while cooling, so much caustic soda in substance or in the form of a solution of 50 per cent. strength as to raise the content of caustic soda solution in the mass to 15 to 18 per cent. strength.

*Example 6.*—The process is conducted as in any one of the foregoing examples, but with the difference that, in the preparation of the alkali cellulose, instead of the caustic soda solution of 18 per cent. strength, a caustic soda solution of 30 per cent. strength is employed.

*Example 7.*—The process is conducted as in any one of the foregoing examples, but with the exception that the treatment of the alkali cellulose with the ethylene chloride is conducted at 50 to 60° C.

Example 8.—The process is conducted as in Example 1 or 2 or 3 or 4, but with the difference that, in the preparation of the alkali cellulose to be treated with ethylene chloride, instead of the aqueous caustic soda solution of 18 per cent. strength, an alcoholic caustic soda solution of 30 per cent. strength (prepared for example by dissolving 6,000 parts of caustic soda in a mixture of 10,000 parts of alcohol of 95 per cent. strength and 4,000 parts of water), is employed, the degree of pressing being 4,000 to 8,000 parts.

Example 9.—The process is conducted as in Example 8 but with the difference that the reaction between the alcoholic alkali cellulose and ethylene chloride is conducted at a raised temperature, for example at 50 to 60° C. for 3 to 5 hours.

Example 10.—The process is conducted as in Example 8 or 9, but with the difference that, instead of the alcoholic caustic soda solution of 30 per cent. strength, an alcoholic caustic potash solution of 10 per cent. strength is employed.

Example 11.—The process is conducted as in any one of the foregoing examples, but with the difference that, instead of 1,000 parts, 300 to 500 parts of ethylene chloride are employed.

Example 12.—The process is conducted as in any one of the foregoing examples, but with the difference that, instead of the ethylene chloride, the equimolecular proportion of propylene chloride is employed.

Example 13.—The procedure is as in any one of the Examples 1 to 11, but with the difference that instead of the ethylene chloride, the equimolecular proportion of tri-methylene chloride

is employed.

Example 14.—The process is conducted as in any one of the Examples 1 to 11, but with the difference that, instead of the ethylene chloride, the equimolecular proportion of ethylidene chloride is employed.

Example 15.—The process is conducted as in any one of the Examples 1 to 11, but with the difference that, instead of the ethylene chloride, the equimolecular proportion of propylidene chloride is employed.

Example 16.—The process is conducted as in any one of the Examples 1 to 11, but with the difference that, instead of the ethylene chloride, the equimolecular proportion of isopropylidene chloride is employed.

Example 17.—The process is conducted as in any one of the Examples 1 to 11, but with the difference that, instead of the ethylene chloride, the equimolecular proportion of methylene chloride is employed.

Example 18.—The process is conducted as in any one of the Examples 1 to 11, but with the difference that, instead of the ethylene chloride, the equimolecular proportion of acetylene-tetrachloride (1:1:2:2-tetra-chlorethane) is employed.

Example 19.—The process is conducted as in any one of the Examples 1 to 11, but with the difference that, instead of the ethylene chloride, the equimolecular proportion of penta-chlorethane is employed.

Example 20.—The process is conducted as in any one of the Examples 1 to 11, but with the difference that, instead of the ethylene chloride, the equimolecular proportion of acetylene-dichloride is employed.

Example 21.—The process is conducted as in any one of the Examples 1 to 11, but with the difference that, instead of the ethylene chloride, the equimolecular proportion of tri-chlorethylene is employed.

Example 22.—The process is conducted as in any one of the Examples 1 to 11, but with the difference that, instead of the ethylene chloride, the equimolecular proportion of vinyl chloride is employed.

Example 23.—The process is conducted as in any one of the Examples 1 to 11, but with the difference that, instead of the ethylene chloride, the equimolecular proportion of tetra-chlorethylene is employed.

Example 24.—The process is conducted as in any one of the Examples 1 to 11, but with the difference that, instead of the ethylene chloride, the equimolecular proportion of allyl-chloride (gamma-chlor-propylene) is employed.

Example 25.—The process is conducted as in any one of the Examples 1 to 11, but with the difference that, instead of the ethylene chloride, the equimolecular proportion of gamma-di-chlor-propylene (β-epi-di-chlorohydrin) is employed.

Example 26.—2,000 parts of a matured or non-matured alkali cellulose containing about 1000 parts of cellulose and about 1000 parts of caustic soda solution of 25 per cent. strength (produced, for example, either by mixing 1000 parts of finely divided cellulose (wood pulp or cotton linters) with 1000 parts of caustic soda solution of 25 per cent. strength in a kneading machine or a shredder at about 10 to 14° C. or by impregnating 1000 parts of cellulose with 20,000 parts of caustic soda solution of 25 per cent. strength and pressing the alkali cellulose to 2000 parts) are placed in a rotating autoclave, whereupon 500 parts of trichlorethylene are added. The autoclave is now closed and heated until the temperature of the mass rises to 90 to 100° C. The reaction mass is kept at this temperature for about 3 to 4 hours, whereupon, after the autoclave has been cooled to room temperature, the reaction mass is washed on a filter, or a straining cloth or in a filter press with hot water until free from alkali. The washed and pressed product in which the water-content has been determined is dissolved in such a quantity of water and caustic soda as to yield a solution containing about 5 to 7 per cent. of the product of the reaction and 8 per cent. of NaOH. To this solution 1000 parts of carbon bisulphide are added and the reaction mixture kept with shaking for 10 hours at 20° C. The solution is now filtered and spun in the manner described in Example 1.

Example 27.—The process is conducted as in Example 26 but with the difference that, before being dissolved for xanthation, the product of the reaction between the alkali cellulose and trichlorethylene is isolated from the crude reaction mass as described in Example 1 of my U. S. specification Ser. No. 521,026.

Example 28.—The process is conducted as in any one of the Examples 1 to 11, but with the difference that, instead of the ethylene chloride, 300 to 600 parts of dichloro-ether are employed.

Example 29.—The process is conducted as in any one of the examples 1 to 11, but with the difference that, instead of the ethylene chloride, 1,000 parts of chloromethyl-ether are employed.

Example 30.—The process is conducted as in any one of the Examples 1 to 11, but with the difference that, instead of the ethylene chloride, 200 to 600 parts of dichloracetaldehyde are employed.

*Example 31.*—The process is conducted as in any one of the Examples 1 to 11, but with the difference that, instead of the ethylene chloride, 500 to 1,000 parts of chloro-acetone are employed.

*Example 32.*—The process is conducted as in any one of the Examples 1 to 11, but with the difference that, instead of the ethylene chloride, 500 to 1,000 parts of di-chloro-acetone are employed.

*Example 33.*—The process is conducted as in any one of the Examples 1 to 11, but with the difference that, instead of the ethylene chloride, 1,000 to 2,000 parts of bromo-pinacoline are employed.

*Example 34.*—The process is conducted as in any one of the Examples 1 to 11, but with the difference that, instead of the ethylene chloride, 1,000 parts to 2,000 parts of bromo-stearic acid, dissolved in 1,000 to 2,000 parts of warm alcohol of 95 per cent. strength, are employed.

The bromo-stearic acid may also be employed in the form of its sodium or potassium salt.

*Example 35.*—The process is conducted as in any one of the Examples 1 to 11, but with the difference that instead of the ethylene chloride, 1,000 to 2,000 parts of dibromo-stearic acid are employed.

*Example 36.*—The process is conducted as in any one of the Examples 1 to 11, but with the difference that, instead of the ethylene chloride, 300 to 1,000 parts of α- or γ-chloro-crotonic acid, preferably dissolved in a small amount of alcohol, are employed.

The chloro-crotonic acid may also be employed in the form of a salt, for example sodium or potassium salt.

*Example 37.*—The process is conducted as in any one of the Examples 1 to 11, but with the difference that, instead of the ethylene chloride, 1,000 to 2,500 parts of mono-bromo-oleic acid are employed.

*Example 38.*—The process is conducted as in any one of the Examples 1 to 11, but with the difference that, instead of the ethylene chloride, 1,000 to 3,000 parts of oleic acid-di-bromide are employed.

*Example 39.*—The process is conducted as in any one of the Examples 1 to 11, but with the difference that, instead of the ethylene chloride, 300 to 800 parts of tri-chloro-lactic acid are employed.

*Example 40.*—The process is conducted as in any one of the Examples 1 to 11, but with the difference that, instead of the ethylene chloride, 500 to 2,000 parts of bromo-laevulinic acid are employed.

*Example 41.*—The process is conducted as in any one of the Examples 1 to 11, but with the difference that, instead of the ethylene chloride, 400 to 3,000 parts of chloropicrin are employed.

*Example 42.*—The process is conducted as in any one of the Examples 1 to 11, but with the difference that, instead of the ethylene chloride, 500 to 1,500 parts of well cooled carbamyl-chloride are employed.

*Example 43.*—The process is conducted as in any one of the Examples 1 to 11, but with the difference that, instead of the ethylene chloride, 400 to 1,000 parts of phenyl-ethyl-carbamyl-chloride are employed.

*Example 44.*—The process is conducted as in any one of the Examples 1 to 11, but with the difference that, instead of the ethylene chloride, 300 to 600 parts of cyanogen bromide are employed.

*Example 45.*—The process is conducted as in any one of the Examples 1 to 11, but with the difference that, instead of the ethylene chloride, 500 to 1,500 parts of cyanuric chloride are employed.

*Example 46.*—The process is conducted as in any one of the Examples 1 to 11, but with the difference that, instead of the ethylene chloride, 500 to 1,200 parts of chloro-succinic acid or the equivalent quantity of its sodium salt are employed.

*Example 47.*—The process is conducted as in any one of the Examples 1 to 11, but with the difference that, instead of the ethylene chloride, 600 to 1,500 parts of di-chloromaleic acid or the equivalent quantity of its sodium salt are employed.

*Example 48.*—The process is conducted as in any one of the Examples 1 to 11, but with the difference that, instead of the ethylene chloride, 100 to 1,000 parts of tri-chlorhydrin are employed.

*Example 49.*—The process is conducted as in any one of the Examples 1 to 11, but with the difference that, instead of the ethylene chloride, 300 to 600 parts of para-toluene-sulphochloride, dissolved in xylene, are employed.

*Example 50.*—The process is conducted as in any one of the Examples 1 to 11, but with the difference that, instead of the ethylene chloride, 1,000 to 2,000 parts of benzoyl chloride are employed.

*Example 51.*—The process is conducted as in any one of the Examples 1 to 11, but with the difference that, instead of the ethylene chloride, 500 to 1,500 parts of ortho-chloro-benzoic acid, dissolved in alcohol, are employed.

*Example 52.*—The process is conducted as in any one of the Examples 1 to 11, but with the difference that, instead of the ethylene chloride, 500 to 1,500 parts of β-phenyl-propylene-glycol-α-chlorhydrin are employed.

*Example 53.*—The process is conducted as in any one of the Examples 1 to 11, but with the difference that, instead of the ethylene chloride, 200 to 1,200 parts of benzyl-glycol-chlorhydrin are employed.

*Example 54.*—The process is conducted as in any one of the Examples 1 to 11, but with the difference that, instead of the ethylene chloride, 400 to 1,400 parts of styrol-dichloride (α, β-dichloro-ethyl-benzene) are employed.

*Example 55.*—The process is conducted as in any one of the Examples 1 to 11, but with the difference that, instead of the ethylene chloride, 500 to 2,000 parts of anethol-di-bromide are employed.

*Example 56.*—The process is conducted as in any one of the Examples 1 to 11, but with the difference that, instead of the ethylene chloride, 1,000 to 1,600 parts of phenyl-chloro-acetic acid, dissolved in a small quantity of alcohol of 95 per cent. strength, are employed. In this example, the phenyl-chloro-acetic acid may also be used in the form of its sodium salt or potassium salt.

*Example 57.*—The process is conducted as in any one of the Examples 1 to 11, but with the difference that, instead of the ethylene chloride, 1,000 to 2,000 parts of phenyl-α-chloro-β-lactic acid, dissolved in alcohol, are employed.

*Example 58.*—The process is conducted as in any one of the Examples 1 to 11, but with the difference that, instead of the ethylene chloride, 600 to 2,600 parts of ω-chloro-styrol are employed.

*Example 59.*—The process is conducted as in any one of the Examples 1 to 11, but with the difference that, instead of the ethylene chloride, 700 to 3,000 parts of sym. di-chloro-styrol are employed.

Example 60.—The process is conducted as in any one of the Examples 1 to 11, but with the difference that, instead of the ethylene chloride, 1,800 to 5,000 parts of styrol-bromide (cinnamic alcohol di-bromide), dissolved in a small quantity of alcohol of 95 per cent. strength, are employed.

Example 61.—The process is conducted as in any one of the Examples 1 to 11, but with the difference that, instead of the ethylene chloride, 400 to 2,100 parts of $\alpha$-chloro-pyridine are employed.

Example 62.—The process is conducted as in any one of the Examples 1 to 11, but with the difference that, instead of the ethylene chloride, 800 to 2,400 parts of $\alpha,\alpha_1$-di-chloro-pyridine are employed.

Example 63.—The process is conducted as in any one of the Examples 1 to 11, but with the difference that, instead of the ethylene chloride, 500 to 4,800 parts of $\alpha$-chloro-quinoline are employed.

Example 64.—A spinning solution, produced in the manner described in one of the foregoing examples is introduced in the known manner into one of the precipitating liquids mentioned in one of the foregoing examples through a suitable hopper or slit, and the coagulated film band, after having been run through this bath, is washed in the known manner and dried.

Example 65.—A cotton material is impregnated or filled or coated, one or several times, in a suitable machine, for instance a padding machine or a back filling machine, or a spreading machine, with a spinning solution produced in the manner described in one of the foregoing examples, to which solution a filling material such as talc of china clay or zinc white (for instance 100 to 200 per cent. calculated on the weight of the cellulose derivative used) or a dyestuff or a pigment, such as mica or lamp-black, may be added and, with or without being dried, and if necessary in a state of tension the filled cotton material is passed through a bath having the composition of one of the coagulating liquids mentioned in the foregoing examples. The dressed or coated fabric is then washed and dried.

Stated in general terms, the production of the xanthate can be conducted by acting upon cellulose in the presence of an alkali, with a halogenated organic derivative as described above, then xanthating by reacting thereupon with carbon bisulphide and an alkali. The xanthate can be dissolved in an alkaline solution, e. g. dilute NaOH solution. The production of artificial structures can be performed by bringing the xanthate solution, while having the shape and form of the desired artificial structure, into a coagulating and/or plasticizing bath or baths.

The simplest and most advantageous procedure is to allow the said xanthate solution of the aforementioned types to enter through suitably formed openings a coagulating bath, for example any one of the coagulating baths known in the viscose art or in the art of making artificial structures from any other alkali-soluble cellulose derivatives, cellulose compounds or cellulose conversion products, e. g. viscose.

The bath may have (A) only a coagulating effect on the shaped solution or (B) a coagulating effect on the shaped solution and a plasticising effect on the artificial structure during or after its coagulation. As illustrative examples of the former type of baths, a solution containing in each liter, 160 grams of $H_2SO_4$ and 320 grams of $Na_2SO_4$, may be used, at a temperature of 45° C. or a solution containing about 10% of $H_2SO_4$, may be used at say 4° C. or 16° C.

For the latter modification (B), particularly suitable coagulating and plasticising baths are such baths as contain not less than about 20 to 40, preferably not less than 45 per cent of $H_2SO_4$, or an equivalent quantity of another mineral acid. Other agents exerting a similar effect, for instance baths consisting of, or containing by itself or in admixture with one or more other organic or one or more inorganic substances, a large proportion—

Of an acid ester formed from a poly-basic inorganic acid and a monohydric or polyhydric aliphatic or aromatic alcohol, such as methylsulphuric or ethylsulphuric acid or a mixture of methyl or ethyl alcohol or of one of their hydrates with concentrated sulphuric acid, or Of glycerophosphoric acid or glycero-sulphuric acid, or a mixture of glycerine with concentrated sulphuric acid, or Of one or more sulphonic acids of aliphatic or aromatic hydrocarbons, such as oxy-(hydroxy-) methylsulphonic acid or methionic acid or methyl- or ethyl-sulphonic acid or a sulphonic acid of a mineral oil or benzol-sulphonic acid or phenol-sulphonic acid by itself or in admixture with sulphuric acid, or Of carboxy-organo-mineral acids, such as sulphoro-di-acetic acid or sulpho-acetic acid by itself or in admixture with sulphuric acid, or Of aromatic sulpho acids containing nitrogen by themselves of in admixture with sulphuric acid, Or baths in which sulphuric acid of less than 55 per cent. strength is used in combination with acid salts, such as bisulphates, for instance ammonium bisulphate, Or strong sulphuric acid containing formaldehyde or pyridine etc., Or a solution of zinc halide alone or mixed with an acid or with another salt or both, or any other plasticising agent or equivalent for strong mineral acid may, however, be used.

The mineral acids or other plasticising agents mentioned above may be used alone or (so far as is in conformity with the conditions of operation) mixed with one or several inorganic substances, for instance with one or several other strong mineral acids, such as hydrochloric acid, nitric acid, or phosphoric acid, or with a neutral or acid salt, such as sodium sulphate or sodium bisulphate, or ammonium bisulphate, ammonium sulphate, magnesium sulphate, zinc sulphate, sodium bisulphite, sodium sulphite sodium nitrate or boric acid. To these or to a mixture of these with another strong acid or with one or several of the above-named inorganic substances, may be added (so far as is in conformity with the conditions under which the mineral acids or other plasticising agents are used) a suitable quantity of one or several organic substances, such as glycerine, or a sugar, such as glucose, or an alcohol, or a salt of an organic base, for instance an aniline salt, or pyridine, or a pyridine salt, or an aldehyde, or an organic acid, such as acetic acid, or formic acid, or lactic acid, or oxalic acid.

It is to be understood that, in the modification of the invention in which coagulating baths that have only little or no plasticizing effect on the freshly coagulated artificial structures are used, all baths known in the viscose art and/or in the art of making artificial structures, particularly threads from any alkali soluble derivatives or conversion products of cellulose and from alkaline cellulose solutions, are meant to be included in the expression "coagulating baths" or "coagulating agents" wherever this expression is used to define such baths as have little or no plasticising effect on the freshly coagulated structure. Consequently, not only the so-called Mueller-bath or any modification thereof and/or the baths set forth in the respective examples come into consideration as coagulating baths in the present process, but all baths known in the viscose art regardless of whether or not, in addition to the purely coagulating constituents, such as acids and/or neutral or acid salts, they contain any other inorganic or organic (liquid, oily crystalline or colloidal) substance or substances.

The modification of the invention in which plasticising media are used, may also be so conducted that, first of all, the xanthate solution is caused to enter through suitably formed openings, a bath which has a coagulating effect on the solution, but little or no plasticising effect on the freshly coagulated artificial structure, and then the artificial structure, preliminarily coagulated, is treated with a medium which exerts a plasticising effect, for instance with a bath having a high content of strong mineral acid, particularly having a content of at least 20 to 40 per cent. of sulphuric acid monohydrate, or any other plasticising bath, for instance one of the plasticising baths aforementioned. This latter method of conducting the process therefore requires two baths in sequence. The second bath serves to plasticise. The first bath may be of such nature that the parent solution coagulates in water-soluble or water-insoluble form; for instance a solution of ammonium sulphate, or sodium bisulphate, or dilute sulphuric acid; or a liquid containing ammonium sulphate and sulphuric acid, or one of the various baths known in the artificial silk art, such as the Mueller-bath or the like. After having been conducted for a certain distance through such a bath, the artificial structure is introduced into a second bath which has a plasticising effect on the coagulated artificial structure, for example a bath composed of one or several strong mineral acids, or containing one or several strong mineral acids, for instance not less than 20 to 40 per cent. of $H_2SO_4$, or an equivalent amount of another strong acid.

In the foregoing examples in which chlorine derivatives are used, if desired or expedient, the equivalent quantities of bromine or iodine derivatives may be substituted for the chlorine derivatives.

Obviously the process can likewise be carried out by substituting one or more hydroxy-groups by means of one or more of the reagents specified in the list of reagents given after the fourth paragraph of the specification and appropriate "mixed" groups or radicals will readily suggest themselves to those skilled in the art.

If desired, the extensibility of the artificial structures, particularly threads, produced according to the present process may be still further increased by treating them with suitable shrinking agents, that is, such shrinking agents as have no dissolving effect on the thread, for example with some of the shrinking agents mentioned in U. S. Patents 1,989,098 to 1,989,101 and 2,001,621 (hot caustic soda solution, sodium sulphide solution etc. of mercerizing strength). They also may be refined or decolorized by treating them with a warm or hot alkali sulphide solution containing at least 5 per cent. of alkali sulphide (calculated as $Na_2S.9H_2O$) or with a warm or hot alkali hydrosulphide solution of equivalent strength.

All other particulars relating to the carrying out of the process as well as the principal modifications of the process, for example various kinds of cellulose that may be used, instead of wood-pulp or cotton linters, and, as far as a plasticising treatment is desired, the various plasticising agents which can be used in lieu of strong sulphuric acid, when a plasticising bath is desired, are described in my U. S. specifications Ser. Nos. 435,648 and 435,649 (now Patents 2,021,861 and 2,021,862).

The expressions "viscose," "artificial materials", "artificial threads", "strong mineral acid", "strong sulphuric acid" used in this specification, have the same meaning as they have in the U. S. Specifications Ser. Nos. 435,648 and 435,649.

The expression "cellulose" means where the context permits, cellulose or its near conversion products, such as cellulose hydrate, hydro-cellulose or oxy-cellulose. In the appended claims, the term "polyhydric alcohol" is intended to embrace alcohols containing two —OH groups as well as those containing more than two —OH groups. In other words, a polyhydric alcohol is one that contains a plurality of hydroxyl groups. The use of certain halogen alkyl amines and halogen aralkyl amines, originally described herein, for reacting upon the cellulose, is not claimed herein but in a separate application Ser. No. 48,051 filed Nov. 2, 1935. The use of alkylating agents and aralkylating agents, for such purpose is not claimed herein but is claimed in a copending case Ser. No. 521,017 filed Mar. 7, 1931. The use of halogen carboxylic acids containing not over 5 carbon atoms and salts and esters thereof, for such purpose is claimed in a copending case now Patent No. 2,087,981. The use of hydroxy alkylating agents for that purpose is claimed in another copending case now Patent No. 2,021,861.

What I claim is:

1. A process of producing formed artificial structures which comprises acting upon cellulose in the presence of an alkali, with at least one halogenated organic substance from the herein described group consisting of—
  (a) Di-halogen paraffins, including compounds of the type of ethylene chloride and trimethylene chloride (which may be regarded as neutral halogen-hydracid esters of di-hydric paraffin alcohols (glycols), and of the type of methylene chloride (which may be regarded as neutral halogen hydracid esters of glycols with two hydroxyl groups attached to one and the same carbon atom),
  (b) Poly-halogen paraffins,
  (c) Halogen olefins (neutral halogen hydracid esters of unsaturated alcohols),
  (d) Halogen derivatives of ethers of mono-hydric alcohols,
  (e) Halogen derivatives of aldehydes and ketones,
  (f) Sulphochlorides of tertiary amines such as the sulpho-chloride of dimethyl-aniline,
  (g) Halogen derivatives of higher fatty acids having at least 6 carbon atoms, (h) Halogen derivatives of olefine mono-carboxyl acids,
(i) Halogen derivatives of hydroxy-acids including β-di-chloro-lactic acid and β-tri-chloro-lactic acid,
(j) Halogen derivatives of keto-carboxylic acids,
(k) Halogen derivatives of nitro-methane including chloro-picrin,
(l) Urea-halides, alkyl-urea halides, aralkyl-urea halides, and aryl-urea halides,
(m) Halogen derivatives of cyanogen including cyanogen halides and cyanuric halides (tri-cyanogen halides),
(n) Halogen derivatives of di-carboxylic acids including halogen succinic acid,
(o) Sulphochlorides of hydrocarbons, including ortho- and para-toluene sulphochloride, naphthalene sulpho-chloride,
(p) Halogen derivatives of halogenated alkyl phenyl ethers including benzoylated chloro-anisol,
(q) Acid halides including benzoyl halides, malonyl halides, di-ethyl malonyl halides,
(r) Halogen derivatives of aromatic mono-carboxylic acids,
(s) Halogen hydracid esters of phenyl glycols and phenyl-glycerines and of their derivatives, including ethers,
(t) Phenyl-halogen-fatty acids including phenyl-chloro-acetic acid and phenyl-chloro-propionic acid,
(u) Halogen derivatives of phenyl-paraffin-alcohol acids, including phenyl-halogen-lactic acid and phenyl-halogen-hydroxy-propionic acid,
(v) Halogen derivatives of olefine-benzols,
(w) Halogen derivatives of phenyl-olefine alcohols and hydroxy-phenyl-olefine alcohols,
(x) Halogen derivatives of pseudophenols, methylene quinones, and quinols, including ortho-hydroxy-mesityl chloride and piperonyl chloride,
(y) Sulphochlorides of phenyl-mono-hydroxy-carboxylic acids, including salicylic acid and cresotinic acid and chloro- and nitro-substitution products thereof,
(z) Halogen derivatives of condensed nuclei, including α-naphthalene-mono-halides and halogen naphthalenes,
(a') Halogen derivatives of hydro-naphthalene compounds, including di-hydro-naphthalene-di-bromide and tetrahydro-naphthalene-glycol-chlorhydrin,
(b') Halogen derivatives of hetero-cyclic compounds having one nitrogen atom in the ring, including halogen derivatives of pyridine and of its homologues, and halogen derivatives of quinoline and of its homologues and halogen derivatives of iso-quinoline and of its homologues,
(c') Sulphochlorides of heterocyclic compounds which contain one nitrogen atom in the ring, including quinoline and pyridine, and thereafter xanthating the product, dissolving the xanthated product in an alkaline solution, forming the solution into the shape of the structure desired, and introducing the shaped solution into a coagulating bath.

2. A process of making formed artificial structures which comprises preparing an intermediate by acting upon cellulose in the presence of an alkali with at least one halogen-containing organic reagent which contains in an aliphatic nucleus two carbon atoms directly connected by a simple double bond, and which is capable of reacting upon cellulose, so as to cause introduction of an organic radical in place of the hydrogen of at least one of the hydroxyl groups of the cellulose molecule, whereby at least one of the hydroxyl groups of the original cellulose is occupied or blocked, as the result of the reaction, by an unsaturated organic group while at least one hydroxyl group remains free, and thereafter xanthating such cellulosic compound, dissolving the xanthate and subjecting the xanthate solution, in a shaped condition, to the action of a coagulating reagent.

3. A process of making formed artificial structures which comprises preparing an intermediate by acting upon cellulose with at least one halogen-containing organic reagent (other than a hydroxy-alkylating agent or an alkylating agent, or an aralkylating agent or a halogen alkyl amine or a halogen aralkyl amine, or a halogen carboxylic acid containing not over 5 carbon atoms, or a salt or ester of such acid), which reagent is capable of reacting with said cellulose so as to cause introduction of an organic radical in place of the hydrogen of at least one of the hydroxyl groups of the cellulose molecule, whereby at least one of the hydroxyl groups of the original cellulose is occupied or blocked, as the result of the reaction, by an organic group while at least one hydroxyl group remains free, and thereafter xanthating such cellulosic compound, dissolving the xanthate and subjecting the xanthate solution, in a shaped condition, to the action of a coagulating agent and plasticizing the freshly coagulated structure.

4. A process of making solutions suitable for transformation into artificial threads or other products, which comprises contacting in the presence of alkali, a cellulosic body containing a plurality of hydroxy groups with at least one halogen-containing reagent (other than a hydroxy-alkylating agent, or an alkylating reagent or an aralkylating reagent or a halogen alkyl amine or a halogen aralkyl amine or a halogen carboxylic acid containing not over 5 carbon atoms or a salt or ester of such acid), which is able to react with a cellulosic body containing a plurality of hydroxyl groups, so as to cause the introduction of an organic radical in place of the hydrogen of at least one of the hydroxyl groups of the cellulose molecule, but not all the hydroxyl groups of said cellulose molecule, and treating the product thereby obtained, with carbon bisulphide in the presence of alkali and dissolving the xanthate thus obtained, and shaping the solution, and coagulating such shaped body substantially as described.

5. A process of making formed artificial structures which comprises reacting upon cellulose in the presence of alkali, with a halogenated organic compound containing two carbon atoms directly connected by a simple double bond in an aliphatic nucleus, xanthating the cellulosic material so produced, dissolving the xanthate, forming the solution into the shape of the artificial structure desired, and coagulating the shaped solution.

6. A process as covered in claim 1, in which the coagulated artificial structure is, while in a freshly coagulated condition, subjected to the action of a mineral acid of such a concentration as to constitute a plasticizing medium therefor.

7. A process as covered in claim 3, in which the plasticizing step is effected by treating the freshly coagulated artificial structure with a liquid bath containing not less than 20% of sulphuric acid monohydrate.

8. A process as covered in claim 3, in which the plasticizing step is effected by treating the freshly coagulated artificial structure with a liquid bath containing not less than 45% of sulphuric acid monohydrate.

9. In the process of making formed artificial structures, from a solution of a xanthate of a cellulosic body prepared by acting on cellulose in the presence of a basic substance, with at least one halogen-containing organic reagent (other than a hydroxy-alkylating agent or an alkylating agent, or an aralkylating agent, or a halogen alkyl amine or a halogen aralkyl amine, or a halogen carboxylic acid containing not over 5 carbon atoms, or a salt or ester of such acid) which reagent is capable of reacting upon said cellulose so as to cause introduction of an organic radical in place of the hydrogen of at least one, but not all, of the hydroxyl groups in the cellulose molecule, whereby at least one of the hydroxyl groups of the original cellulose is blocked by an organic group, as the result of the reaction, while at least one hydroxyl group remains free, thereafter xanthating the cellulose compound produced and dissolving the xanthate so formed; the improvement which comprises shaping the solution of the said xanthate into the shape of the artificial structure desired and acting upon said shaped solution, with a coagulating agent to produce a shaped artificial structure.

10. In the process of making formed artificial structures wherein a cellulose compound made by reacting on cellulose in the presence of a basic substance, with an organic reagent capable of reacting on said cellulose to substitute an organic radical in place of at least one of the hydroxyl hydrogen atoms of said cellulose, but not all of the hydroxyl hydrogen atoms thereof, xanthating the reaction product, and dissolving the xanthate in an alkaline liquid, shaping the solution of said xanthate into the shape of the desired artificial structure, and acting upon the so-shaped solution with a coagulating agent; the improvement which comprises the steps of treating the said cellulose in the presence of an alkali with a halogen-containing organic reagent other than a hydroxy-alkylating agent, or an alkylating agent or an aralkylating agent or a halogen alkyl amine or a halogen aralkyl amine or a halogen carboxylic acid containing not over 5 carbon atoms, xanthating the cellulose compound so produced, dissolving the xanthate, giving the xanthate solution the shape of the desired artificial structure, coagulating said so-shaped solution, and subjecting the freshly coagulated artificial structure so formed, to the action of a bath that will have a plasticizing action thereupon.

11. In the process of making formed artificial structures wherein a cellulose compound made by reacting on cellulose in the presence of a basic substance, with an organic reagent capable of reacting on said cellulose to substitute an organic radical in place of at least one of the hydroxyl hydrogen atoms of said cellulose, but not all of the hydroxyl hydrogen atoms thereof, xanthating the reaction product, and dissolving the xanthate in an alkaline liquid, shaping the solution of said xanthate into the shape of the desired artificial structure, and acting upon the so-shaped solution with a coagulating agent; the improvement which comprises the step of treating the said cellulose in the presence of an alkali with a halogen-containing organic reagent other than a hydroxyl-alkylating agent, or an alkylating agent, or an aralkylating agent, or a halogen alkyl amine, or a halogen aralkyl amine, or a halogen carboxylic acid containing not over 5 carbon atoms, xanthating the cellulose compound so produced, dissolving the xanthate, giving the xanthate solution the shape of the desired artificial structure and coagulating said so-shaped solution.

12. A process of making artificial structures by coagulating a shaped solution of xanthate of a cellulosic body, which process comprises the treatment of a shaped solution of at least one of the herein described new xanthates of cellulosic bodies, which are xanthates of such cellulose derivatives as can be made by reacting on cellulose in the presence of alkali with halogenated organic compounds capable of reacting upon cellulose in the presence of an alkali to introduce organic radicals in place of hydroxyl halogen of said cellulose, other than a hydroxy-alkylating agent, or an alkyl halide, or an aralkyl halide, or a halogen alkylamine or a halogen aralkyl amine, or a halogen fatty acid or a salt or ester of such acid.

13. A process of making artificial structures by coagulating a shaped solution of a xanthate of a cellulosic body, which process comprises the treatment of a shaped solution of at least one of the herein described new xanthates of cellulosic bodies prepared as set forth in claim 1 by a coagulating process.

14. A process of making formed artificial structures which comprises preparing an intermediate by acting upon cellulose in the presence of a basic substance, with at least one halogen-containing organic reagent (other than a hydroxy-alkylating agent, or an alkylating agent or an aralkylating agent, or a halogen alkyl amine or a halogen aralkyl amine or a halogen carboxylic acid containing not over 5 carbon atoms or a salt or ester of such acid) which reagent is capable of reacting with said cellulose so as to cause introduction of an organic radical in place of the hydrogen of at least one of the hydroxyl groups of the cellulose molecule, whereby at least one of the hydroxyl groups of the original cellulose is occupied or blocked, as the result of the reaction, by an organic group while at least one hydroxyl group remains free, and thereafter xanthating such cellulosic compound, dissolving the xanthate and subjecting the xanthate, in a shaped condition, to the action of a coagulating agent.

15. A process as covered in claim 14, in which the artificial structure produced by such coagulation step is, while in the freshly coagulated condition, subjected to the action of a medium that has a plasticizing action thereupon.

16. A process of making formed artificial structures wherein a solution of a cellulosic compound made by reacting a halogenated organic compound made as set forth in claim 10, and xanthating the product, together with cellulose xanthate, is formed into the appropriate shape and acted upon with a medium which has a coagulating effect on the shaped material and with a medium which has a plasticizing effect on the freshly coagulated material.

17. A formed artificial structure containing a reaction product of cellulose with one at least of the materials set forth in claim 1.

LEON LILIENFELD.